(12) United States Patent
Patro et al.

(10) Patent No.: US 11,869,339 B2
(45) Date of Patent: Jan. 9, 2024

(54) DELIVERING AND MONITORING EMERGENCY ALERT SYSTEM (EAS) MEDIA FILES VIA ROUTER COMPUTING DEVICES USING REDIRECTION RESPONSES

(71) Applicant: Charter Communications Operating, LLC, St. Louis, MO (US)

(72) Inventors: Ajit Kumar Patro, Parker, CO (US); Puneet Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/883,409

(22) Filed: May 26, 2020

(65) Prior Publication Data
US 2021/0375122 A1 Dec. 2, 2021

(51) Int. Cl.
| | |
|---|---|
| H04N 7/10 | (2006.01) |
| G08B 27/00 | (2006.01) |
| G06F 16/955 | (2019.01) |
| H04N 21/61 | (2011.01) |
| H04N 21/643 | (2011.01) |
| H04H 20/59 | (2008.01) |

(52) U.S. Cl.
CPC ......... *G08B 27/005* (2013.01); *G06F 16/955* (2019.01); *H04H 20/59* (2013.01); *H04N 21/6106* (2013.01); *H04N 21/64322* (2013.01)

(58) Field of Classification Search
CPC ............. G08B 27/005; H04N 21/6106; H04N 21/64322; H04H 20/59; G06F 16/955
See application file for complete search history.

(56) References Cited

U.S. PATENT DOCUMENTS

| | | | | |
|---|---|---|---|---|
| 8,407,736 B2* | 3/2013 | McClenny | ....... | H04N 21/43074 455/404.1 |
| 8,650,590 B2* | 2/2014 | Howarter | ................. | H04N 5/76 725/116 |
| 9,548,828 B1* | 1/2017 | Kuznetsov | ............. | H04H 20/59 |

(Continued)

OTHER PUBLICATIONS

Fielding, R., et al., Request for Comments (RFC) 7231, Section 6.4.7: "307 Temporary Redirect," Internet Engineering Task Force (IETF), Jun. 2014, 101 pages.

*Primary Examiner* — Annan Q Shang
(74) *Attorney, Agent, or Firm* — Dority & Manning, P.A.

(57) ABSTRACT

Delivery and monitoring of Emergency Alert System (EAS) media files via router computing devices using redirection responses is disclosed herein. In one embodiment, a router computing device receives an EAS notification from a server computing device. The EAS notification received by the router computing device includes an EAS media file manifest Universal Resource Locator (URL) of an EAS media file to be pushed to subscribers. Upon receiving the EAS notification, the router computing device intercepts an Internet Protocol (IP) streaming content request from a client computing device that is communicatively coupled to the router computing device, and transmits a redirection response message that includes the EAS media file manifest URL to the client computing device. Upon receiving the redirection response message from the router computing device, the client computing device is redirected from any currently streaming media to the EAS media file manifest URL.

20 Claims, 11 Drawing Sheets

(56) References Cited

U.S. PATENT DOCUMENTS

| | | | |
|---|---|---|---|
| 9,773,407 B2* | 9/2017 | Eyer | G08B 27/008 |
| 10,924,891 B1* | 2/2021 | Mouline | H04W 4/90 |
| 2008/0092199 A1* | 4/2008 | McCarthy | H04N 21/26291 |
| | | | 725/133 |
| 2008/0172678 A1* | 7/2008 | Lee | H04L 63/10 |
| | | | 719/315 |
| 2009/0007170 A1* | 1/2009 | Everitt | H04N 21/4316 |
| | | | 348/588 |
| 2009/0144765 A1* | 6/2009 | Branam | H04N 21/2407 |
| | | | 725/1 |
| 2009/0248828 A1* | 10/2009 | Gould | H04N 21/814 |
| | | | 709/207 |
| 2010/0186030 A1* | 7/2010 | Yun | H04H 20/82 |
| | | | 725/33 |
| 2011/0078727 A1* | 3/2011 | Foti | H04N 7/17336 |
| | | | 725/34 |
| 2011/0154391 A1* | 6/2011 | Velazquez | H04N 21/8106 |
| | | | 725/33 |
| 2013/0276017 A1* | 10/2013 | Walker | H04N 21/4524 |
| | | | 725/31 |
| 2014/0033255 A1* | 1/2014 | Daly | H04N 21/64322 |
| | | | 725/37 |
| 2014/0037267 A1* | 2/2014 | Yang | G11B 27/11 |
| | | | 386/248 |
| 2014/0059594 A1* | 2/2014 | Stein | H04N 21/436 |
| | | | 725/33 |
| 2014/0095924 A1* | 4/2014 | Holden | H04L 12/1868 |
| | | | 714/4.11 |
| 2015/0237398 A1* | 8/2015 | Wang | H04N 21/6125 |
| | | | 725/110 |
| 2015/0256277 A1* | 9/2015 | Johnson | H04L 67/26 |
| | | | 340/601 |
| 2017/0264947 A1* | 9/2017 | Gerhards | H04N 21/4263 |

* cited by examiner

DELIVERING AND MONITORING EMERGENCY ALERT SYSTEM (EAS) MEDIA FILES VIA ROUTER COMPUTING DEVICES USING REDIRECTION RESPONSES

BACKGROUND

The Emergency Alert System (EAS) is a national warning system used in the United States to broadcast EAS messages for alerting the general public of potential or actual emergencies that may affect a community or geographic region. An EAS message may include media such as video, audio, and/or text content, and may be accessible using a Universal Resource Locator (URL) pointing to an EAS media file manifest for an EAS media file stored on a content delivery network (CDN) server. The EAS media file may then be viewed using conventional Internet Protocol (IP) streaming media player devices. However, multiple-system operators (MSOs) currently lack mechanisms for pushing EAS media files to unmanaged IP streaming devices at a subscriber's location, which limits the effective reach of the EAS system.

SUMMARY

The embodiments disclosed herein provide delivery of Emergency Alert System (EAS) media files via router computing devices using redirection responses to push EAS media files to subscribers, and monitoring the viewing of the EAS media files to determine the reach of the EAS media files and to selectively resend the EAS media files if necessary.

In one embodiment, a method for delivering and monitoring EAS media files via router computing devices using redirection responses is provided. The method includes receiving, by a router computing device from a server computing device, a first EAS notification comprising an EAS media file manifest Universal Resource Locator (URL) of an EAS media file. The method further comprises, responsive to receiving the first EAS notification, intercepting, by the router computing device from a client computing device communicatively coupled to the router computing device, a first Internet Protocol (IP) streaming content request. The method also comprises, further responsive to receiving the first EAS notification, transmitting, by the router computing device to the client computing device, a first redirection response message comprising the EAS media file manifest URL.

In another embodiment, a router computing device is provided. The router computing device comprises a memory and a processor device communicatively coupled to the memory. The processor device is configured to receive, from a server computing device, a first EAS notification comprising an EAS media file manifest URL of an EAS media file. The processor device is further configured to, responsive to receiving the first EAS notification, intercept, from a client computing device communicatively coupled to the router computing device, a first IP streaming content request. The processor device is also configured to, further responsive to receiving the first EAS notification, transmit, to the client computing device, a first redirection response message comprising the EAS media file manifest URL.

In another embodiment, a server computing device is provided. The server computing device comprises a memory and a processor device communicatively coupled to the memory. The processor device is configured to transmit, to a router computing device, a first EAS notification comprising an EAS media file manifest URL of an EAS media file. The processor device is further configured to receive, from the router computing device, a completion message comprising an identifier of a client computing device communicatively coupled to the router computing device and a completion indication representing whether the client computing device viewed the entirety of the EAS media file. The processor device is also configured to store the identifier of the client computing device, an identifier of the router computing device, an identifier of a subscriber associated with the router computing device, and the completion indication in an EAS viewership database. The processor device is additionally configured to calculate, based on the EAS viewership database, one or more of a number of subscribers within a geographic region that received the EAS media file and a number of subscribers within the geographic region that did not view the entirety of the EAS media file.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
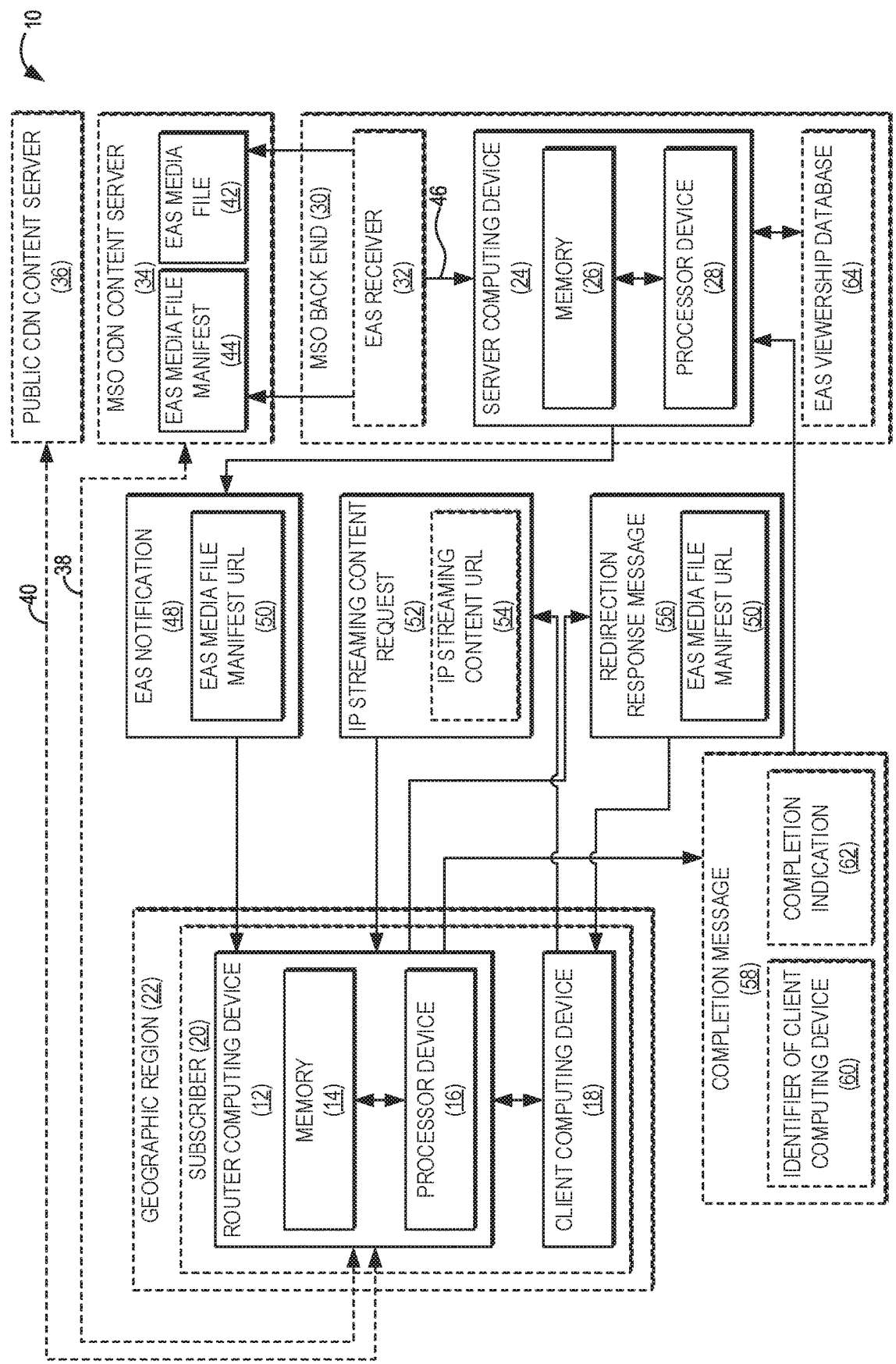
FIG. 1 is a block diagram illustrating an exemplary communications network, including a server computing device, a router computing device, and a client computing device, configured to deliver and monitor Emergency Alert System (EAS) media files using redirection responses.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The Emergency Alert System (EAS) is a national warning system used in the United States to broadcast EAS messages to alert the general public of potential or actual emergencies that may affect a community or geographic region. The EAS is part of the Integrated Public Alert and Warning System (IPAWS), and is jointly coordinated by the Federal Emergency Management Agency (FEMA), the Federal Communications Commission (FCC), and the National Weather Service (NWS). An EAS message may include media such as video, audio, and/or text content, and may be accessed using a Universal Resource Locator (URL) pointing to an EAS media file manifest for an EAS media file stored on a content delivery network (CDN) server. The EAS media file can then be streamed using conventional Internet Protocol (IP) streaming media player devices.

As used herein, a "multiple-system operator (MSO)" refers to an operator that provides multiple cable or direct-broadcast satellite television services and/or internet access to subscribers. An MSO may provide services to subscribers using "managed devices" (e.g., cable boxes, receiver sets, cable modems, and/or router computing devices, as non-limiting examples) that are controlled and managed by the MSO. MSOs may also support "unmanaged devices" (such as streaming media player devices and/or apps, as non-limiting examples) that subscribers may use to directly access streaming media via the internet access provided by the MSO. The MSO is generally able to control what a subscriber is able to view via a managed device, but may not be able to exert the same level of control over what a subscriber can view using an unmanaged device.

To support distribution of EAS media files to subscribers, the MSO may provide an alert distribution system that includes an EAS entry point server for receiving EAS messages from government entities such as FEMA or IPAWS. In the event of an emergency, the EAS entry point server of the MSO receives an EAS message including an EAS media file, and may send the EAS media file, along with relevant data such as geographic regions affected by the emergency, to an EAS receiver of the MSO. The EAS receiver, in turn, performs processing on the EAS media file (e.g., transcoding the EAS media file to convert it into a multi-bitrate media file), and sends the processed EAS media file and an EAS media file manifest to an MSO CDN content server. The MSO can then direct managed devices at subscriber locations within the geographic region to display the EAS media file provided by the MSO CDN content server. However, conventional techniques do not provide mechanisms for the MSO to push the EAS media file to unmanaged devices at subscriber locations. This may result in subscribers not receiving the EAS media files, and consequently being unaware of or unable to prepare for the emergency.

In this regard, the embodiments disclosed herein enable delivery and monitoring of EAS media files via router computing devices using redirection responses. In one embodiment, a router computing device (such as an MSO managed wireless or wired router at a subscriber location, as a non-limiting example) receives an EAS notification from a server computing device (e.g., an MSO command-and-control server, as a non-limiting example). The EAS notification received by the router computing device includes an EAS media file manifest Universal Resource Locator (URL) of an EAS media file to be pushed to subscribers. Upon receiving the EAS notification, the router computing device intercepts an IP streaming content request from a client computing device, such as an unmanaged streaming media player device, that is communicatively coupled to the router computing device. The router computing device then transmits a redirection response message (e.g., a HyperText Transport Protocol (HTTP) 307 redirection response message) that includes the EAS media file manifest URL to the client computing device. Upon receiving the redirection response message from the router computing device, the client computing device is redirected from any currently streaming media to the EAS media file manifest URL, and begins streaming the EAS media file.

According to some embodiments, the router computing device may also transmit a completion message to the server computing device. The completion message includes an identifier of the client computing device and a completion indication that represents whether the client computing device viewed the entirety of the EAS media file. The server computing device may store the data provided by the completion message in an EAS viewership data. Using the EAS viewership database, the server computing device may calculate, as non-limiting examples, a number of subscribers within the geographic region that received the EAS media file and/or a number of subscribers within the geographic region that did not view the entirety of the EAS media file. The server computing device in some embodiments also may use the EAS viewership database to identify at least one subscriber that did not view the entirety of the EAS media file, and may send another EAS notification to only at least one router computing device corresponding to the at least one subscriber. Each router computing device among the at least one router computing device may then intercept another IP streaming content request from a client computing device that did not view the entirety of the EAS media file, and transmit a redirection response message comprising the EAS media file manifest URL to only the client computing device that did not view the entirety of the EAS media file. In this manner, the EAS media file may be selectively resent only to client computing devices that did not view the entirety of the EAS media file, thus conserving network bandwidth while ensuring the widest possible distribution of the EAS media file.

FIG. 1 is a block diagram illustrating an exemplary communications network 10 that may be utilized to deliver and monitor EAS media files via router computing devices using redirection responses. The communications network 10 in the example of FIG. 1 includes a router computing device 12 comprising a memory 14 communicatively coupled to a processor device 16. The router computing device 12 in some embodiments may comprise an MSO managed wireless router or an MSO managed wired router, as non-limiting examples. The router computing device 12 is communicatively coupled to a client computing device 18, which may comprise an IP streaming media player device or a conventional computing device executing a streaming media app, as non-limiting examples. Because the router computing device 12 provides router functionality to the client computing device 18, all network traffic to and from the client computing device 18 (including HTTP requests sent from the client computing device 18 and HTTP responses sent to the client computing device 18) passes through the router computing device 12, and thus can be accessed and manipulated by the router computing device 12.

The router computing device 12 and the client computing device 18 shown in FIG. 1 are associated with a subscriber 20 within a geographic region 22. The subscriber 20 represents a person or household that subscribes to services provided by an MSO, while the geographic region 22 represents an area within which the MSO provides services. It is to be understood that, while FIG. 1 illustrates only the single geographic region 22 and the single subscriber 20, some embodiments may encompass multiple geographic regions 22, each of which may contain multiple subscribers 20. Moreover, it is to be further understood that the subscriber 20 may be associated with multiple router computing devices 12, and the router computing device 12 may be communicatively coupled to multiple client computing devices 18.

The communications network 10 of FIG. 1 also includes a server computing device 24 that comprises a memory 26 communicatively coupled to a processor device 28. According to some embodiments, the server computing device 24 may comprise an MSO command-and-control server within an MSO back end 30, as a non-limiting example. The MSO back end 30 in some embodiments may also include an EAS receiver 32 comprising a computing device configured to receive EAS messages from an EAS entry point server (not shown).

The communications network 10 in the example of FIG. 1 also includes an MSO CDN content server 34 to enable subscribers to access IP streaming content provided by the MSO, as well as a public CDN content server 36 (such as, e.g., Netflix, Hulu, Amazon Prime Video, YouTube, and the like) for streaming available IP streaming content for free and/or to paying customers. The client computing device 18 thus can access the MSO CDN content server 34 and the public CDN content server 36 via the router computing device 12, as indicated by arrows 38 and 40, respectively. It is to be understood that the elements of the communications network 10, including the router computing device 12, the server computing device 24, the MSO CDN content server 34, and the public CDN content server 36 are interconnected via a publicly accessible network (e.g., the internet) and/or a private network.

In exemplary operation, in the event of an emergency, the EAS receiver 32 receives an EAS message (not shown) from an EAS entry point server (not shown) of the MSO back end 30. The EAS message received by the EAS receiver 32 includes an EAS media file 42 to be distributed to affected members of the public, and may also include additional information such as an identification of a geographic region affected by the emergency. The EAS receiver 32 performs processing on the EAS media file 42 (e.g., transcoding the EAS media file 42 to convert it into a multi-bitrate media file), and sends the EAS media file 42 to the MSO CDN content server 34. The EAS receiver 32 also sends an EAS media file manifest 44 (which may contain, as non-limiting examples, URLs for accessing video profiles and media segments of the EAS media file 42, and data regarding the size and duration of the EAS media file 42) to the MSO CDN content server 34. The EAS media file 42 and the EAS media file manifest 44 may be sent to the MSO CDN content server 34 via other intermediate servers, such as an origin server configured to host web content files (not shown). Additionally, the EAS receiver 32 sends information regarding the location of the EAS media file 42 and the EAS media file manifest 44 to the server computing device 24, as indicated by arrow 46.

The server computing device 24 then transmits an EAS notification 48 comprising an EAS media file manifest URL 50 to the router computing device 12. The EAS media file manifest URL 50 indicates the location of the EAS media file manifest 44 stored by the MSO CDN content server 34, and may be used by devices such as the client computing device 18 to access the EAS media file 42. According to some embodiments, the server computing device 24 may transmit the EAS notification 48 to the router computing device 12 in response to the server computing device 24 identifying the geographic region 22 as a geographic region to which the EAS notification 48 applies, and determining that the router computing device 12 is within the geographic region 22 (based on, as non-limiting examples, an MSO billing system (not shown) within the MSO back end 30).

After receiving the EAS notification 48, the router computing device 12 intercepts an IP streaming content request 52 from the client computing device 18. As used herein, "intercepting" the IP streaming content request 52 entails the router computing device 12 receiving the IP streaming content request 52 sent by the client computing device 18, and preventing the IP streaming content request 52 from being passed on via the communications network 10. The IP streaming content request 52 represents a request (e.g., an HTTP request) for IP streaming content, and is directed by the client computing device 18 to a content provider such as the public CDN content server 36. In some embodiments, the IP streaming content request 52 includes an IP streaming content URL 54 that identifies a location of the IP streaming content to be streamed to the client computing device 18. In such embodiments, the router computing device 12 may store the IP streaming content URL 54 for later use in returning the client computing device 18 to the IP streaming content that it was originally attempting to access.

The router computing device 12 then transmits a redirection response message 56 to the client computing device 18. The redirection response message 56 includes the EAS media file manifest URL 50, and in some embodiments may comprise an HTTP 307 redirection response message. The redirection response message 56, when received by the client computing device 18, causes the client computing device 18 to redirect to the EAS media file manifest URL 50, and begin streaming the EAS media file 42 from the MSO CDN content server 34. Some embodiments may provide that the redirection response message 56 is transmitted to the client computing device 18 based on the router computing device 12 identifying the client computing device 18 as a streaming media client device. In this manner, the router computing device 12 may avoid sending the redirection response message 56 to IP devices not suitable for viewing streaming media, such as security cameras or videoconferencing devices.

In the example of FIG. 1, the router computing device 12 also calculates a duration of the EAS media file 42 (e.g., based on the EAS media file manifest 44 at the location indicated by the EAS media file manifest URL 50, as a non-limiting example). When the router computing device 12 detects that playback of the EAS media file 42 by the client computing device 18 has ended, the router computing device 12 calculates a viewing time of the EAS media file 42 by the client computing device 18. Based on the calculated duration of the EAS media file 42 and the calculated viewing time by the client computing device 18, the router computing device 12 determines whether the client computing device 18 viewed the entirety of the EAS media file 42. The router computing device 12 then transmits a completion message 58, comprising an identifier 60 of the client computing device 18 and a completion indication 62, to the server computing device 24. The identifier 60 may comprise any unique identifier for the client computing device 18, such as a media access control (MAC) address, a host name, and/or a host IP address, as non-limiting examples. The completion indication 62 may comprise, as a non-limiting example, a bit indicator whose value indicates whether the client computing device 18 viewed the entirety of the EAS media file 42.

Upon receiving the completion message 58, the server computing device 24 stores the identifier 60 of the client computing device 18 and the completion indication 62, along with other data such as an identifier (not shown) of the router computing device 12 and an identifier (not shown) of the subscriber 20, in an EAS viewership database 64. The server computing device 24 then uses the EAS viewership database 64 to calculate, e.g., a number of subscribers within the geographic region 22 that received the EAS media file 42, and/or a number of subscribers within the geographic region 22 that did not view the entirety of the EAS media file 42. In some embodiments, the results of the calculations performed by the server computing device 24 may be used by the MSO back end 30 to generate a display showing statistics and/or summary information regarding the number of subscribers that received and/or viewed the EAS media file 42. For example, the server computing device 24 may forward the results of its calculations to a computing device (not shown) within the MSO back end 30 for generating and displaying an EAS monitoring dashboard for the geographic region 22. As discussed in greater detail below with respect to FIGS. 3A-3D, the server computing device 24 may also use the EAS viewership database 64 to send additional EAS notifications to only router computing devices associated with subscribers that did not view the entirety of the EAS media file 42.

Figure 2:
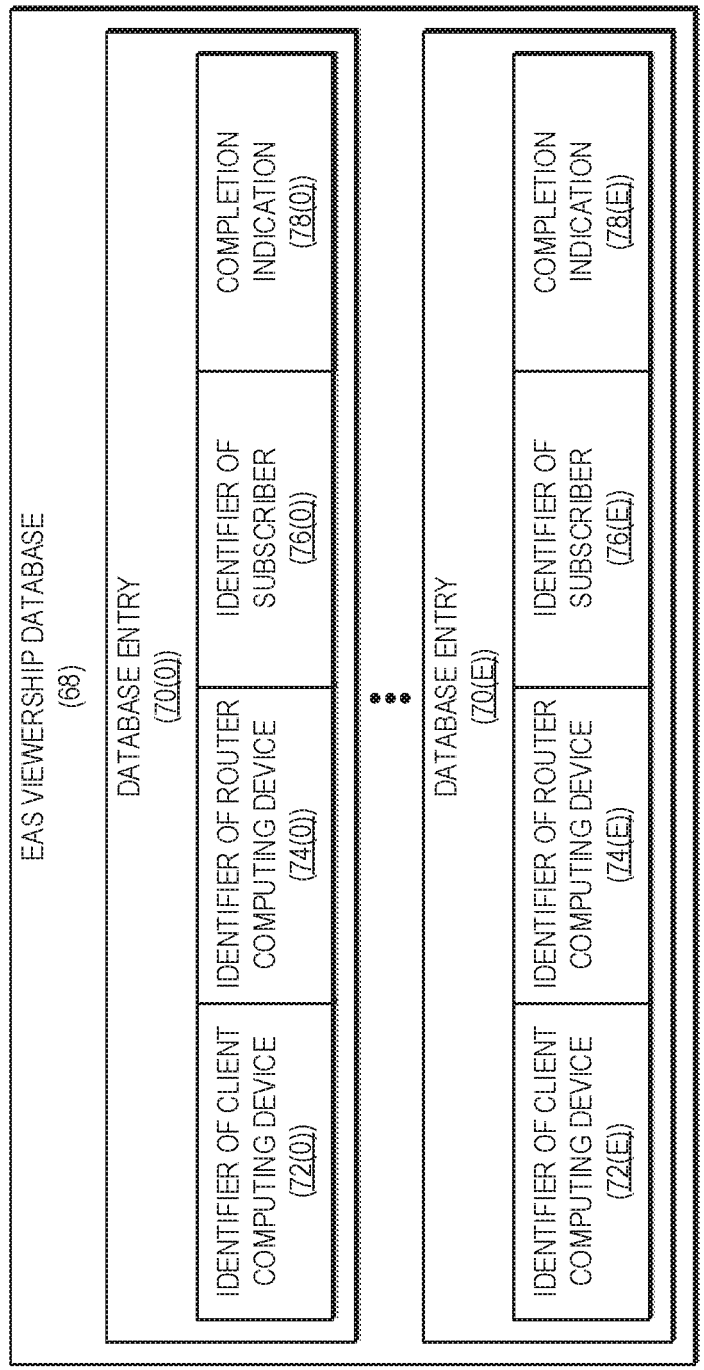
FIG. 2 is a block diagram illustrating the EAS viewership database of FIG. 1, which may be utilized in monitoring EAS media file viewing in accordance with some embodiments.

To illustrate exemplary contents of the EAS viewership database 64 of FIG. 1 in accordance with some embodiments, FIG. 2 is provided. FIG. 2 shows an EAS viewership database 68 that corresponds in functionality to the EAS viewership database 64 of FIG. 1. The EAS viewership database 68 includes a plurality of database entries 70(0)-70(E), each of which corresponds to a client computing device (such as the client computing device 18 of FIG. 1), a router computing device (such as the router computing device 12 of FIG. 1) to which the client computing device is communicatively coupled, and a subscriber (such as the subscriber 20 of FIG. 1) associated with the router computing device. Accordingly, the database entries 70(0)-70(E) comprise corresponding identifiers 72(0)-72(E) of client computing devices, and corresponding identifiers 74(0)-74(E) of router computing devices. The database entries 70(0)-70(E) further include corresponding identifiers 76(0)-76(E) of subscribers, and corresponding completion indications 78(0)-78(E). The completion indications 78(0)-78(E) may be used by a server computing device (such as the server computing device 24 of FIG. 1) to determine whether the corresponding subscriber using the corresponding client computing device viewed an EAS media file in its entirety. The database entries 70(0)-70(E) in some embodiments may include additional information not shown in FIG. 2, such as an identifier of the corresponding EAS media file.

FIGS. 3A-3D are message sequence diagrams illustrating messages sent and operations performed when delivering and monitoring EAS media files via router computing devices using redirection responses, in accordance with some embodiments. In FIGS. 3A-3D, elements of FIG. 1, including the client computing device 18, the router computing device 12, the server computing device 24, the MSO CDN content server 34, the EAS receiver 32, and the public CDN content server 36, are represented by vertical lines. Communications between the illustrated elements are represented by numbered arrows between the corresponding vertical lines, while operations performed by the illustrated elements are represented by numbered blocks. It is to be understood that, in some embodiments, the communications and operations illustrated herein may be performed in an order other than that shown in FIGS. 3A-3D, and/or may be omitted.

Figure 3A:
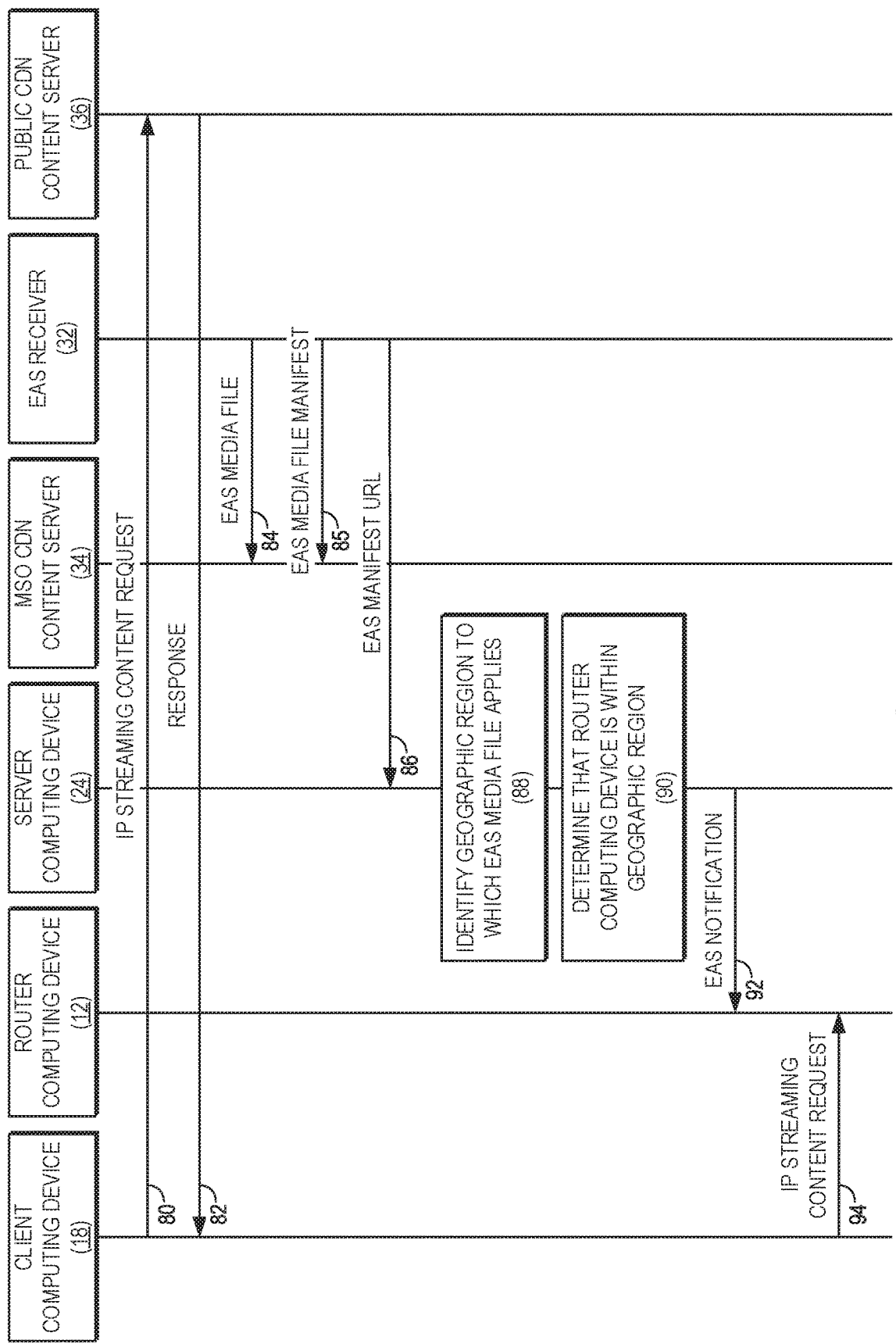
FIGS. 3A-3D are message sequence diagrams illustrating messages sent and operations performed when delivering and monitoring EAS media files via router computing devices using redirection responses, in accordance with some embodiments.

In FIG. 3A, operations begin with the client computing device 18 transmitting an IP streaming content request 80 to the public CDN content server 36. The IP streaming content request 80 may comprise an HTTP request to view IP streaming content provided by the public CDN content server 36. The public CDN content server 36 then sends a response 82 (comprising, e.g., an HTTP response message) to the client computing device 18, which proceeds to stream the requested IP streaming content from the public CDN content server 36.

Subsequently, the EAS receiver 32, having received an EAS message (not shown), sends an EAS media file 84 and an EAS media file manifest 85 to the MSO CDN content server 34 for later streaming to the client computing device 18. The EAS receiver 32 also sends an EAS media file manifest URL 86, identifying a location of the EAS media file manifest 85, to the server computing device 24. In the example of FIG. 3A, the server computing device 24 uses the EAS media file manifest URL 86 to identify a geographic region to which the EAS media file 84 applies, as indicated by block 88. The server computing device 24 determines, based on the identified geographic region, that the router computing device 12 is within the affected geographic region, as indicated by block 90. Accordingly, the server computing device 24 transmits an EAS notification 92 to the router computing device 12. The router computing device 12 then intercepts an IP streaming content request 94 sent by the client computing device 18 (e.g., an HTTP request intended for the public CDN content server 36). Operations then continue in FIG. 3B.

Figure 3B:
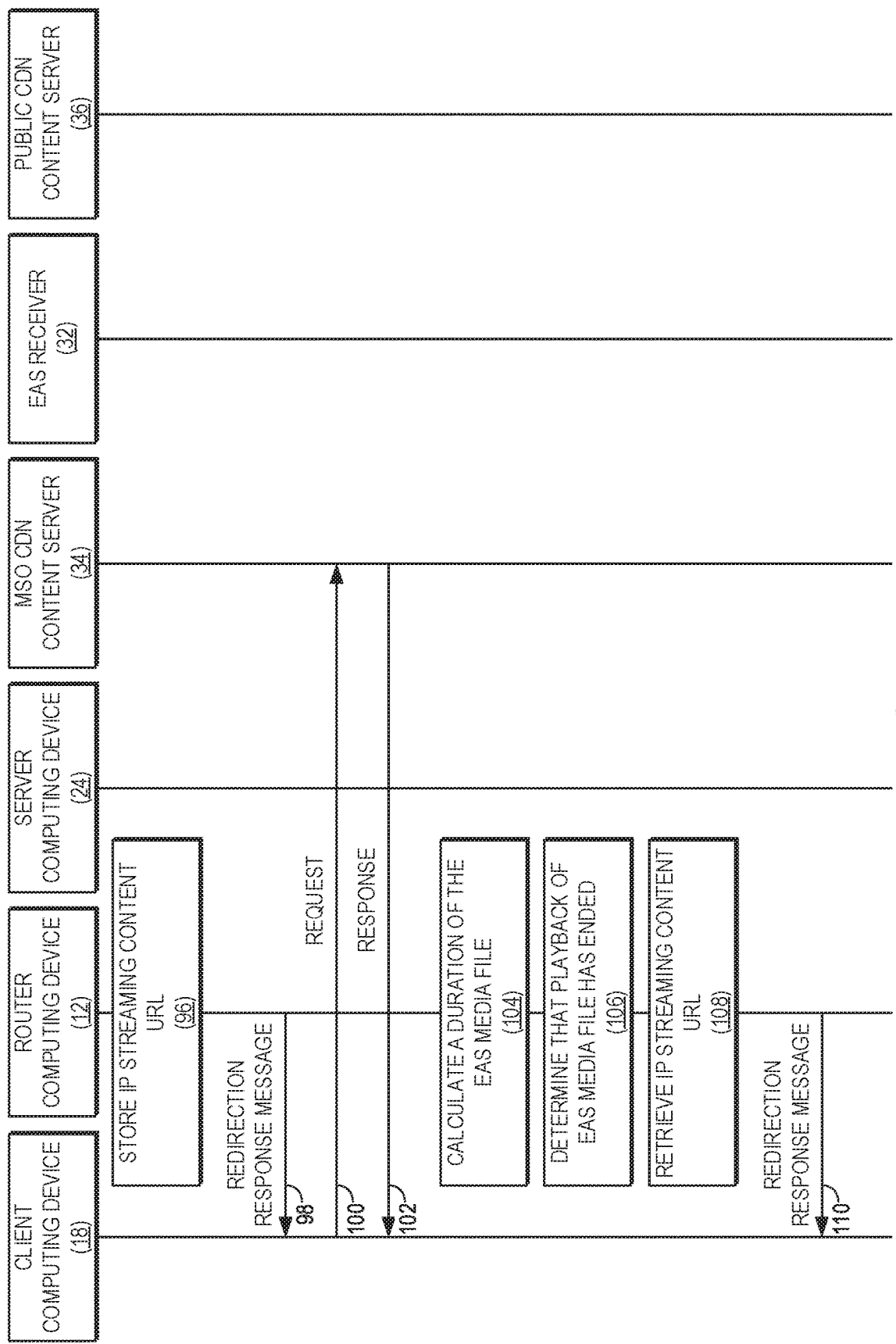

Turning now to FIG. 3B, the router computing device 12 in this example stores an IP streaming content URL provided by the IP streaming content request 94, as indicated by block 96. The router computing device 12 then sends a first redirection response message 98 to the client computing device 18. The first redirection response message 98 may comprise, e.g., an HTTP 307 redirection response message that includes the EAS media file manifest URL 86. Upon receiving the first redirection response message 98, the client computing device 18 sends a request 100 containing the EAS media file manifest URL 86 to the MSO CDN content server 34. The MSO CDN content server 34 then sends a response 102 to the client computing device 18 and begins streaming the EAS media file 84 to the client computing device 18.

The router computing device 12 next calculates a duration of the EAS media file 84, as indicated by block 104, and determines that playback of the EAS media file 84 by the client computing device 18 has ended, as indicated by block 106. Upon determining that playback of the EAS media file 84 has ended, the router computing device 12 retrieves the previously stored IP streaming content URL, as indicated by block 108. The router computing device 12 sends a second redirection response message 110, comprising the retrieved IP streaming content URL, to the client computing device 18. Operations then continue in FIG. 3C.

Figure 3C:
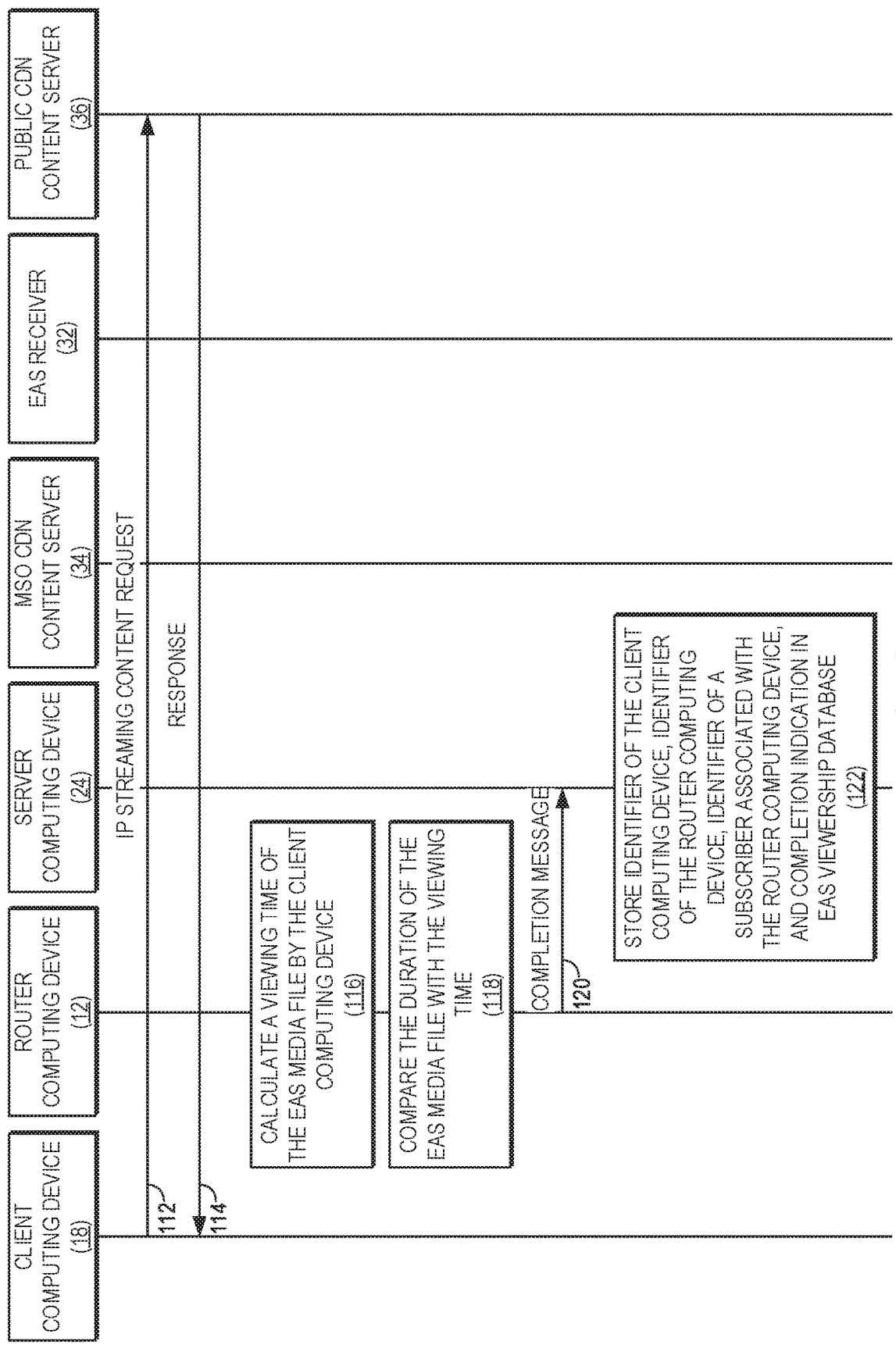

Referring now to FIG. 3C, upon receiving the second redirection response message 110 comprising the retrieved IP streaming content URL, the client computing device 18 uses the IP streaming content URL to send an IP streaming content request 112 to the public CDN content server 36. The public CDN content server 36 sends a response 114, and the client computing device 18 then continues streaming the IP streaming content that it was streaming prior to being redirected by the router computing device 12.

In the example of FIG. 3C, the router computing device 12, after determining that playback of the EAS media file 84 has ended, calculates a viewing time of the EAS media file 84 by the client computing device 18, as indicated by block 116. The router computing device 12 then compares the duration of the EAS media file 84 with the calculated viewing time, as indicated by block 118. In this manner, the router computing device 12 can determine whether the client computing device 18 viewed the entirety of the EAS media file 84. The router computing device 12 then sends a completion message 120 to the server computing device 24. The server computing device 24, upon receiving the completion message 120, stores an identifier of the client computing device 18, an identifier of the router computing device 12, an identifier of a subscriber associated with the router computing device 12, and a completion indication of the completion message 120 in an EAS viewership database, as indicated by block 122. Operations then continue in FIG. 3D.

Figure 3D:
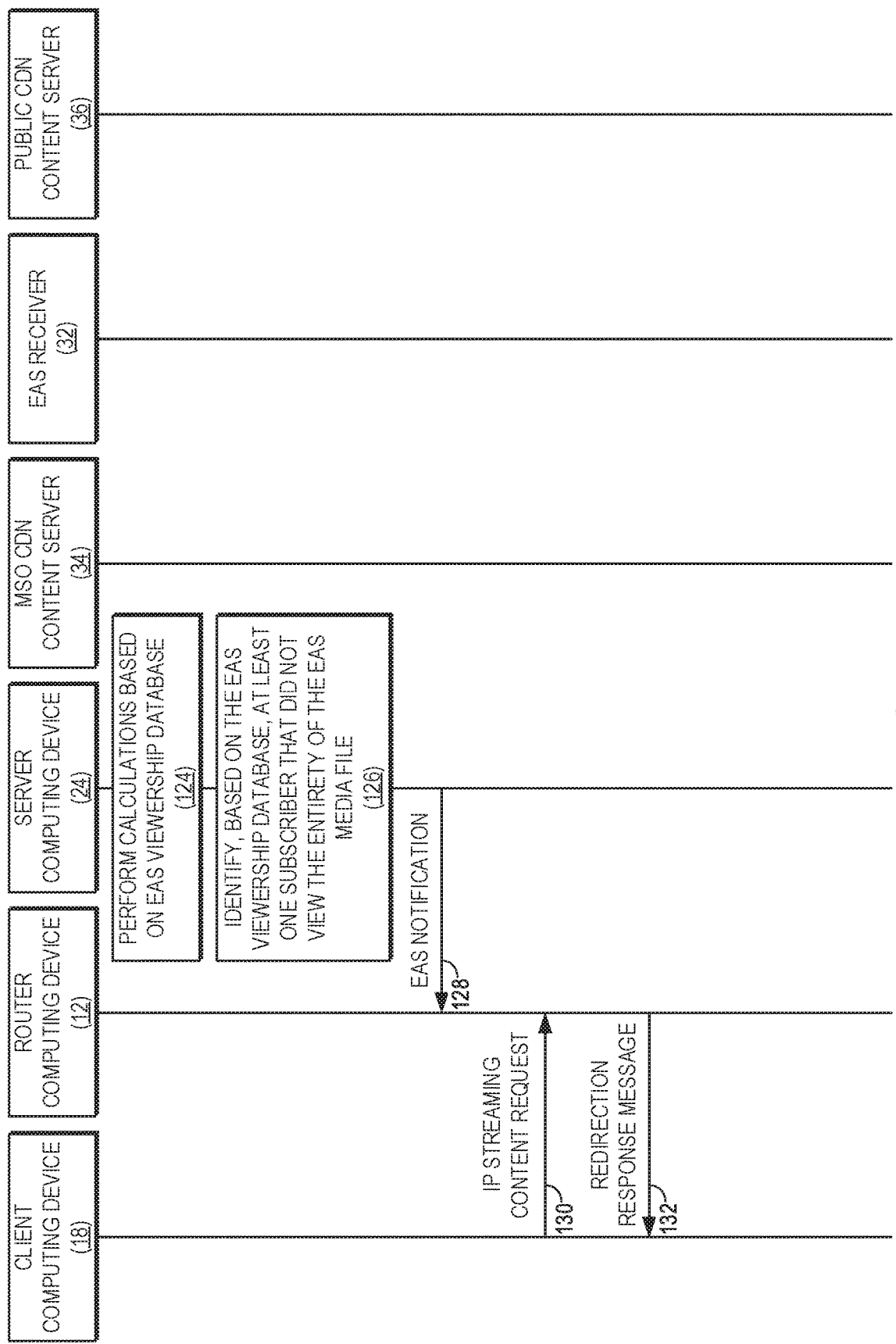

Turning now to FIG. 3D, the server computing device 24 performs calculations based on the EAS viewership database, as indicated by block 124. These calculations may include, as non-limiting examples, calculating a number of subscribers within a geographic region that received the EAS media file 84, and/or a number of subscribers within the geographic region that did not view the entirety of the EAS media file 84. The server computing device 24 may also identify, based on the EAS viewership database, at least one subscriber that did not view the entirety of the EAS media file 84 (block 126). The server computing device 24 then resends another EAS notification to only at least one router computing device associated with the at least one subscriber (as opposed to resending the EAS notification to all router computing devices). Assuming for the sake of this example that the router computing device 12 is associated with a subscriber that did not view the entirety of the EAS media file 84, the server computing device 24 thus sends an EAS notification 128 to the router computing device 12. In some embodiments, the EAS notification 128 includes the identifiers (such as the identifier 60) of any client computing devices (such as the client computing device 18) that are associated with the router computing device 12 and that did not view the entirety of the EAS media file 42.

The router computing device 12 then identifies, based on the EAS notification 128, its associated client computing devices that did not view the entirety of the EAS media file 84. In the example of FIG. 3D, the client computing device 18 was one such client computing device. Accordingly, the router computing device 12 intercepts another IP streaming content request 130 from the client computing device 18. The router computing device 12 then transmits another redirection response message 132 to the client computing device 18 to cause the client computing device 18 to stream the EAS media file 84 again.

Figure 4A:
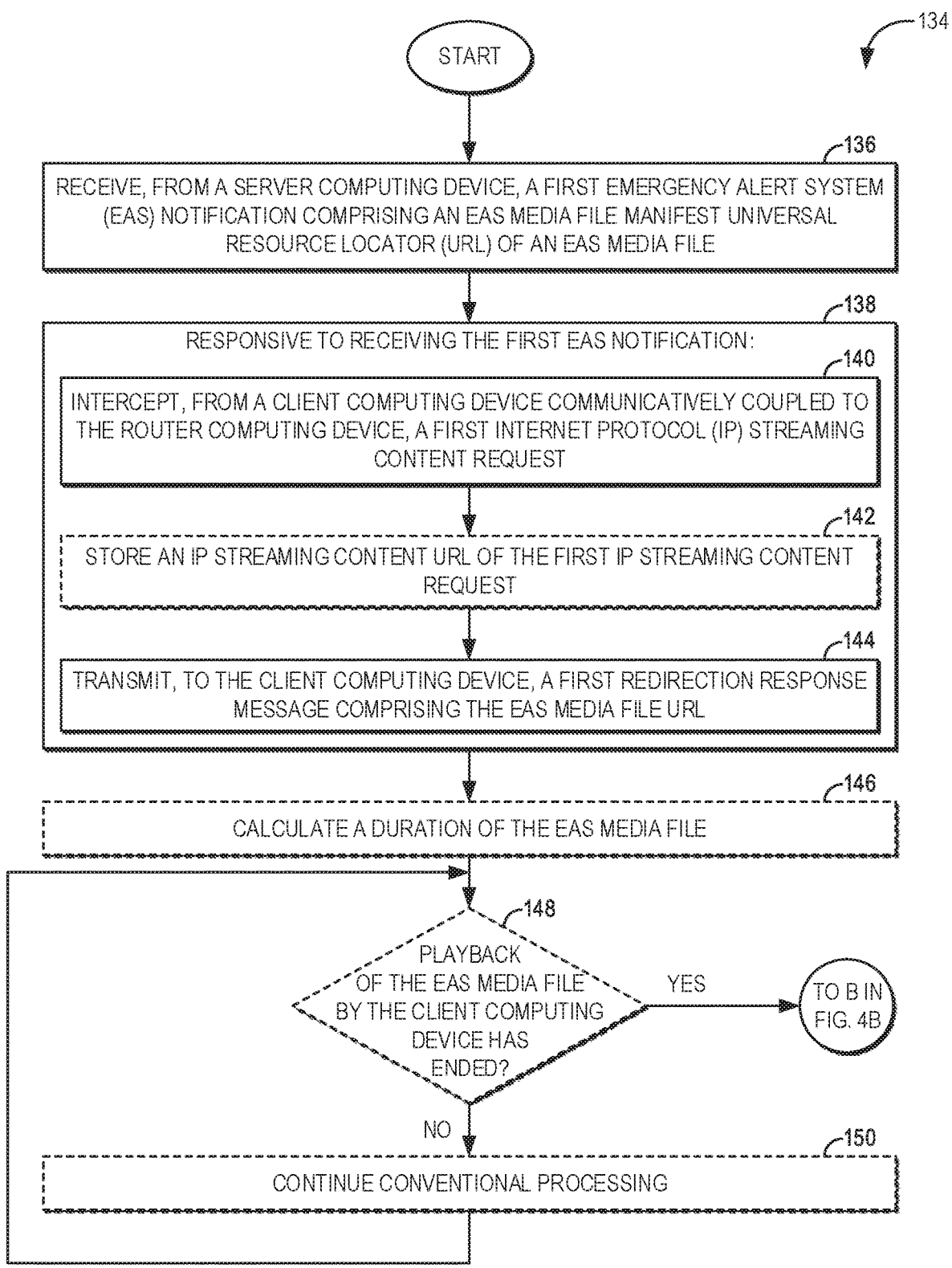
FIGS. 4A and 4B are flowcharts illustrating exemplary operations of the router computing device of FIG. 1 for delivering EAS media files to subscribers using redirection responses, in accordance with some embodiments.
Figure 4B:
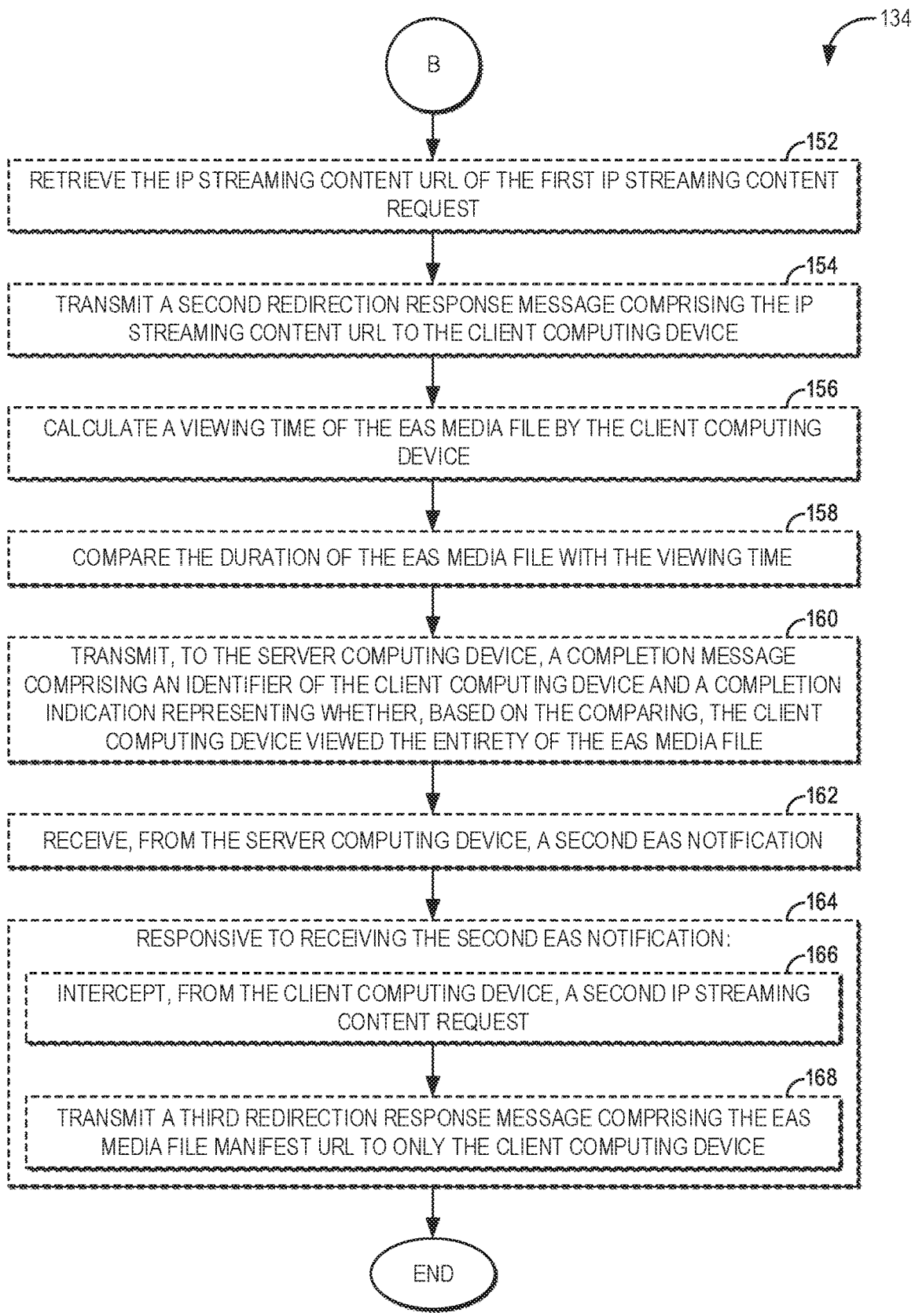

To illustrating exemplary operations of the router computing device 12 of FIG. 1 for delivering EAS media to subscribers using redirection responses in accordance with some embodiments, FIGS. 4A and 4B provide a flowchart 134. For the sake of clarity, elements of FIGS. 1 and 3A-3D are referenced in describing FIGS. 4A and 4B. Operations in FIG. 4A begin with the router computing device 12 receiving, from the server computing device 24, the EAS notification 48 (i.e., "first EAS notification 48") comprising the EAS media file manifest URL 50 of the EAS media file 42 (block 136). The router computing device 12 then performs a series of operations responsive to receiving the first EAS notification 48, as indicated by block 138. The router computing device 12 intercepts, from the client computing device 18 communicatively coupled to the router computing device 12, the IP streaming content request 52 (i.e., "first IP streaming content request 52") (block 140). In some embodiments, the router computing device 12 stores the IP streaming content URL 54 of the first IP streaming content request 52 (block 142). The router computing device 12 then transmits, to the client computing device 18, a redirection response message 56 (i.e., "first redirection response message 56") comprising the EAS media file manifest URL 50 (block 144).

In some embodiments, the router computing device 12 may calculate a duration of the EAS media file 42 (block 146). The router computing device 12 may then determine whether playback of the EAS media file 42 by the client computing device 18 has ended (block 148). If not, the router computing device 12 continues conventional processing (block 150). The router computing device 12 may subsequently return to block 148 to recheck whether playback of the EAS media file 42 by the client computing device 18 has ended. If the router computing device 12 determines at decision block 148 that playback of the EAS media file 42 by the client computing device 18 has ended, processing continues at block 152 of FIG. 4B.

Referring now to FIG. 4B, upon determining at decision block 148 of FIG. 4A that playback of the EAS media file 42 has ended, the router computing device 12 in some embodiments may retrieve the IP streaming content URL 54 of the first IP streaming content request 52 (block 152). The router computing device 12 may then transmit a second redirection response message (such as the redirection response message 110 of FIG. 3B) comprising the IP streaming content URL 54 to the client computing device 18 (block 154). In this manner, the client computing device 18 may be redirected back to the IP streaming content that it was streaming prior being redirected to the EAS media file 42.

Some embodiments may provide that the router computing device 12 may also calculate a viewing time of the EAS media file 42 by the client computing device 18 (block 156). The router computing device 12 may next compare the duration of the EAS media file 42 with the viewing time (block 158). The router computing device 12 may then transmit, to the server computing device 24, a completion message 58 comprising the identifier 60 of the client computing device 18 and the completion indication 62 representing whether, based on the comparing, the client computing device 18 viewed the entirety of the EAS media file 42 (block 160). If the completion indication 62 indicates that the client computing device 18 did not view the entirety of the EAS media file 42, the router computing device 12 may subsequently receive, from the server computing device 24, a second EAS notification (such as the EAS notification 128 of FIG. 3D) (block 162). In some embodiments, the EAS notification 128 includes the identifiers (such as the identifier 60) of any client computing devices (such as the client computing device 18) that are associated with the router computing device 12 and that did not view the entirety of the EAS media file 42.

In response to receiving the second EAS notification 128, the router computing device 12 performs a series of operations indicated by block 164. First, the router computing device 12 intercepts a second IP streaming content request by the client computing device 18 (such as the IP streaming content request 130 of FIG. 3D) (block 166). The router computing device 12 then transmits a third redirection response message comprising the EAS media file manifest URL 50 (such as the redirection response message 132 of FIG. 3D) to only the client computing device 18 (block 168).

Figure 5A:
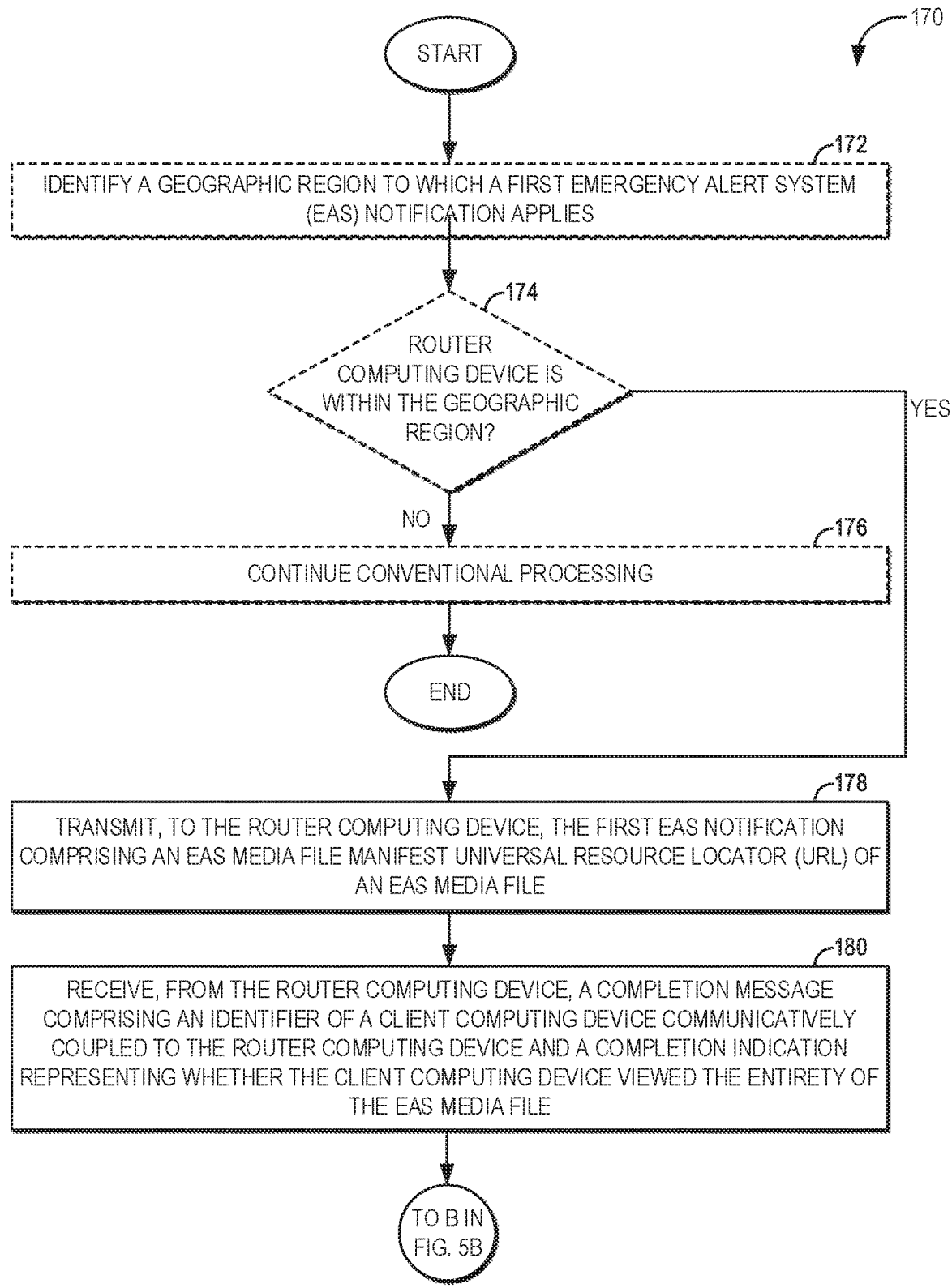
FIGS. 5A and 5B are flowcharts illustrating exemplary operations of the server computing device of FIG. 1 for monitoring EAS media file viewing by subscribers using completion messages provided by the router computing device of FIG. 1, in accordance with some embodiments.
Figure 5B:
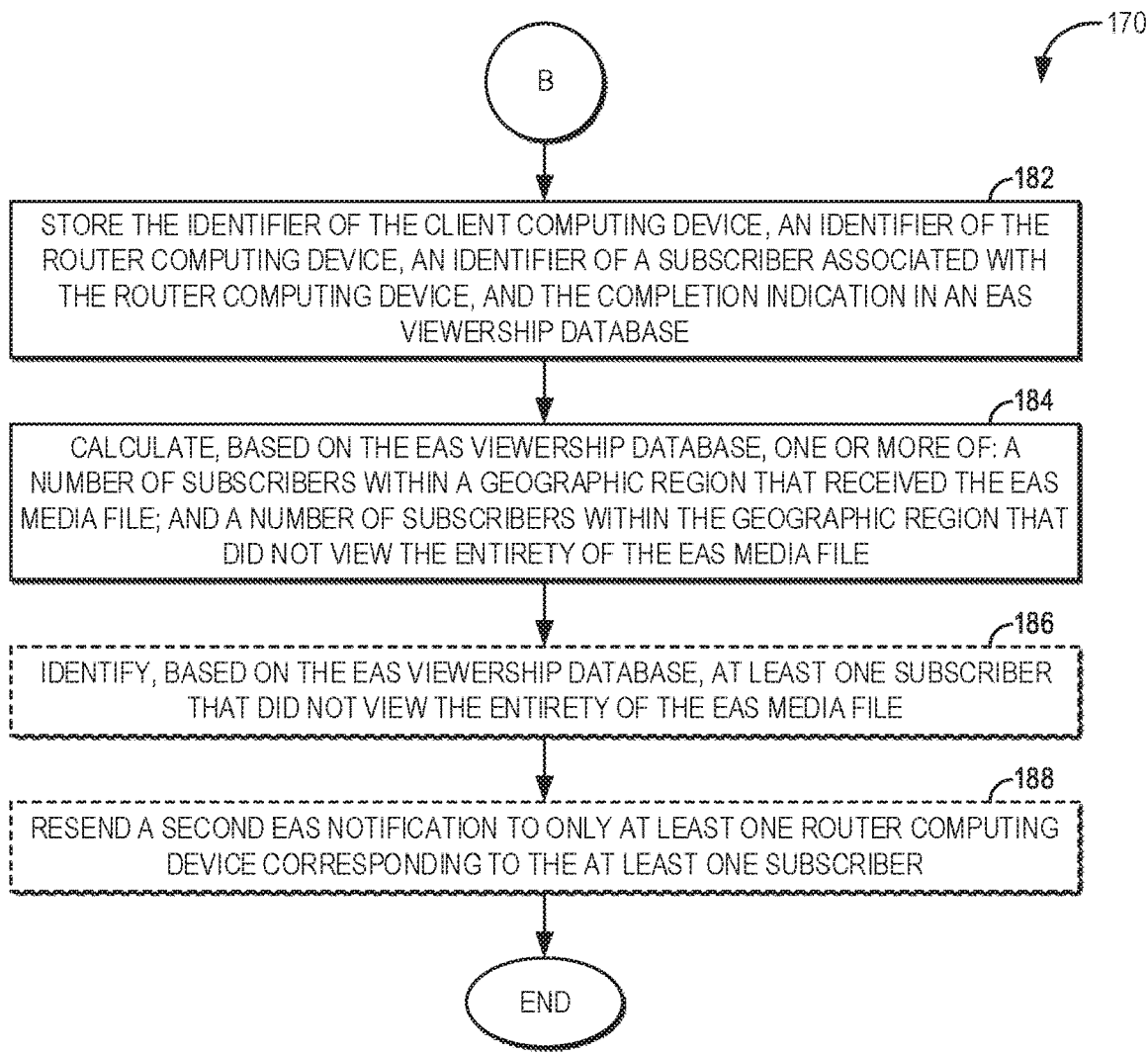

FIGS. 5A and 5B provide a flowchart 170 illustrating exemplary operations of the server computing device 24 of FIG. 1 for monitoring EAS media viewing by subscribers using completion messages provided by the router computing device 12 of FIG. 1, in accordance with some embodiments. Elements of FIGS. 1, 2, and 3A-3D are referenced in describing FIGS. 5A and 5B for the sake of clarity. In some embodiments, operations in FIG. 5A begin with the server computing device 24 identifying a geographic region, such as the geographic region 22, to which the EAS notification 48 applies (block 172). The server computing device 24 then determines whether the router computing device 12 is within the geographic region 22 (block 174). If not, the server computing device 24 continues conventional processing (block 176). However, if the server computing device 24 determines at block 174 that the router computing device 12 is within the geographic region 22, the server computing device 24 transmits, to the router computing device 12, the EAS notification 48 (i.e., "first EAS notification 48") comprising the EAS media file manifest URL 50 of the EAS media file 42 (block 178). The server computing device 24 subsequently receives, from the router computing device 12, the completion message 58 comprising the identifier 60 of the client computing device 18 communicatively coupled to the router computing device 12 and the completion indication 62 representing whether the client computing device 18 viewed the entirety of the EAS media file 42 (block 180). Operations then continue at block 182 of FIG. 5B.

Turning now to FIG. 5B, the server computing device 24 next stores the identifier 60 of the client computing device 18, an identifier of the router computing device 12 (such as the identifiers 74(0)-74(E) of FIG. 2), an identifier of a subscriber 20 associated with the router computing device 12 (such as the identifiers 76(0)-76(E) of FIG. 2), and the completion indication 62 in an EAS viewership database 64 (block 182). The server computing device 24 then calculates, based on the EAS viewership database 64, one or more of a number of subscribers within the geographic region 22 that received the EAS media file 42, and a number of subscribers within the geographic region 22 that did not view the entirety of the EAS media file 42 (block 184).

In some embodiments, the server computing device 24 may identify, based on the EAS viewership database 64, at least one subscriber (such as the subscriber 20 of FIG. 1) that did not view the entirety of the EAS media file 42 (block 186). The server computing device 24 may then resend a second EAS notification (such as the EAS notification 128 of FIG. 3D) to only at least one router computing device (such as the router computing device 12) corresponding to the at least one subscriber 20 (block 188). In some embodiments, the second EAS notification 128 includes the identifier 60 of any client computing devices, such as the client computing device 18, that are associated with the router computing device 12 and that did not view the entirety of the EAS media file 42.

Figure 6:
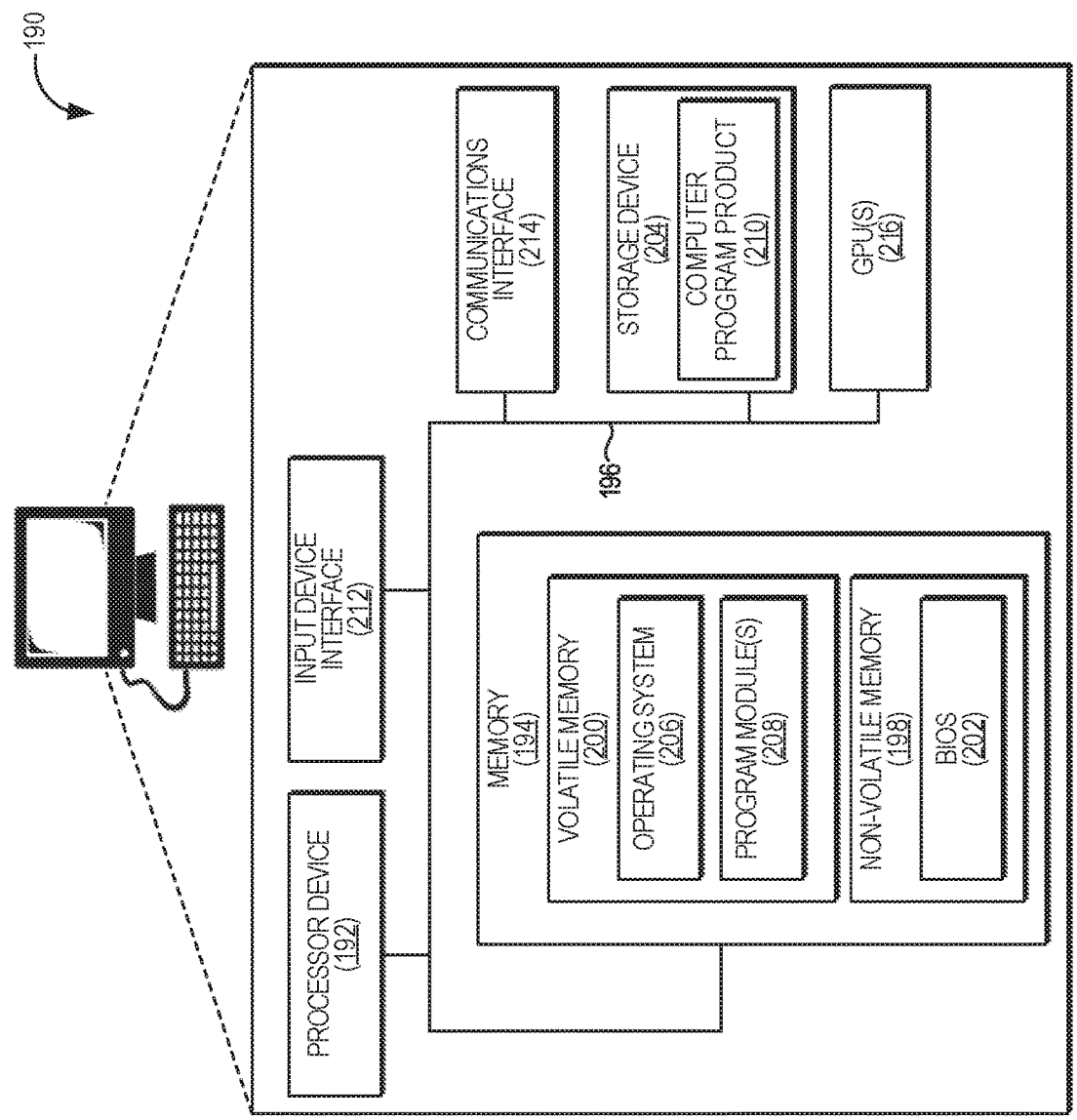
FIG. 6 is a block diagram of a computing device suitable for implementing embodiments disclosed herein.

FIG. 6 is a block diagram of a computing device 190, such as the router computing device 12, the server computing device 24, and the client computing device 18 of FIG. 1, suitable for implementing examples according to one embodiment. The computing device 190 may comprise any computing or electronic device capable of including firmware, hardware, and/or executing software instructions to implement the functionality described herein, such as a computer server or the like. The computing device 190 includes a processor device 192, a memory 194, and a system bus 196. The system bus 196 provides an interface for system components including, but not limited to, the memory 194 and the processor device 192. The processor device 192 can be any commercially available or proprietary processor.

The system bus 196 may be any of several types of bus structures that may further interconnect to a memory bus (with or without a memory controller), a peripheral bus, and/or a local bus using any of a variety of commercially available bus architectures. The memory 194 may include non-volatile memory 198 (e.g., read-only memory (ROM), erasable programmable read-only memory (EPROM), electrically erasable programmable read-only memory (EEPROM), etc.), and volatile memory 200 (e.g., random-access memory (RAM)). A basic input/output system (BIOS) 202 may be stored in the non-volatile memory 198 and can include the basic routines that help to transfer information between elements within the computing device 190. The volatile memory 200 may also include a high-speed RAM, such as static RAM, for caching data.

The computing device 190 may further include or be coupled to a non-transitory computer-readable storage medium such as a storage device 204, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 204 and other drives associated with computer-readable media and computer-usable media may provide non-volatile storage of data, data structures, computer-executable instructions, and the like, such as the VR content.

A number of modules can be stored in the storage device 204 and in the volatile memory 200, including an operating system 206 and one or more program modules 208, which may implement the functionality described herein in whole or in part. All or a portion of the examples disclosed herein may be implemented as a computer program product 210 stored on a transitory or non-transitory computer-usable or computer-readable storage medium, such as the storage device 204, which includes complex programming instructions, such as complex computer-readable program code, to cause the processor device 192 to carry out the steps described herein. Thus, the computer-readable program code can comprise software instructions for implementing the functionality of the examples described herein when executed by the processor device 192. The processor device 192 may serve as a controller, or control system, for the computing device 190 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 192 through an input device interface 212 coupled to the system bus 196 but can be connected through other interfaces such as a parallel port, an Institute of Electrical and Electronic Engineers (IEEE) 1394 serial port, a Universal Serial Bus (USB) port, an IR interface, and the like.

The computing device 190 may also include a communications interface 214 suitable for communicating with a network as appropriate or desired. The computing device 190 includes one or more graphic processing units (GPUs) 216.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a router computing device from a server computing device, a first Emergency Alert System (EAS) notification comprising an EAS media file manifest Universal Resource Locator (URL) of an EAS media file, wherein the EAS media file manifest URL indicates a location of an EAS media file manifest, the router computing device being configured to route requests from a client computing device to a content server that is configured to stream content;
   responsive to receiving the first EAS notification:
      intercepting, by the router computing device from the client computing device that is communicatively coupled to the router computing device, a first Internet Protocol (IP) streaming content request that is directed to the content server, wherein intercepting the first IP streaming content request comprises:
         receiving the first IP streaming content request via a communications network; and
         preventing the first IP streaming content request from being passed on via a communications network to the content server; and
         transmitting, by the router computing device to the client computing device, a first redirection response message comprising the EAS media file manifest URL;
      determining, by the routing computing device, that playback of the EAS media file by the client computing device has ended; and
      responsive to determining that the playback of the EAS media file by the client computing device has ended, transmitting, by the routing computing device, a completion message to the server computing device, the completion message comprising an identifier of the client computing device and a completion indication representing whether the client computing device viewed the entirety of the EAS media file.

2. The method of claim 1, further comprising:
   storing an IP streaming content URL of the first IP streaming content request;
   determining, by the router computing device, that playback of the EAS media file by the client computing device has ended; and
   responsive to determining that the playback of the EAS media file by the client computing device has ended:
      retrieving the IP streaming content URL of the first IP streaming content request; and
      transmitting a second redirection response message comprising the IP streaming content URL to the client computing device.

3. The method of claim 1, further comprising:
   calculating a duration of the EAS media file; and
   responsive to determining that the playback of the EAS media file by the client computing device has ended:
      calculating a viewing time of the EAS media file by the client computing device; and
      comparing the duration of the EAS media file with the viewing time,
      wherein the completion indication included in the completion message is based on the comparison of the duration of the EAS media file with the viewing time.

4. The method of claim 3, wherein calculating the duration of the EAS media file is based on an EAS media file manifest at a location indicated by the EAS media file manifest URL.

5. The method of claim 3, further comprising:
   receiving, by the server computing device, the completion message from the router computing device; and
   storing the identifier of the client computing device, an identifier of the router computing device, an identifier of a subscriber associated with the router computing device, and the completion indication in an EAS viewership database.

6. The method of claim 5, further comprising calculating, by the server computing device based on the EAS viewership database, one or more of:
   a number of subscribers within a geographic region that received the EAS media file; and
   a number of subscribers within the geographic region that did not view the entirety of the EAS media file.

7. The method of claim 5, further comprising:
   identifying, by the server computing device based on the EAS viewership database, at least one subscriber that did not view the entirety of the EAS media file; and
   resending, by the server computing device, a second EAS notification to only at least one router computing device corresponding to the at least one subscriber.

8. The method of claim 7, wherein:
   the at least one router computing device comprises the router computing device; and
   the method further comprises:
      receiving, by the router computing device, the second EAS notification; and
      responsive to receiving the second EAS notification:
         intercepting a second IP streaming content request by the client computing device; and
         transmitting a third redirection response message comprising the EAS media file manifest URL to only the client computing device.

9. The method of claim 1, further comprising:
   identifying, by the server computing device, a geographic region to which the first EAS notification applies;
   determining that the router computing device is within the geographic region; and
   responsive to determining that the router computing device is within the geographic region, transmitting the first EAS notification to the router computing device.

10. The method of claim 1, wherein the router computing device comprises a Multiple-System Operator (MSO) managed wireless router.

11. The method of claim 1, wherein transmitting the first redirection response message comprising the EAS media file manifest URL to the client computing device is based on the router computing device identifying the client computing device as a streaming media client device.

12. The method of claim 1, wherein the redirection response message comprises a HyperText Transport Protocol (HTTP) 307 response.

13. A router computing device, comprising:
a memory; and
a processor device communicatively coupled to the memory and configured to:
receive, from a server computing device, a first Emergency Alert System (EAS) notification comprising an EAS media file manifest Universal Resource Locator (URL) of an EAS media file, wherein the EAS media file manifest URL indicates a location of an EAS media file manifest, the router computing device being configured to route requests from a client computing device to a content server that is configured to stream content;
responsive to receiving the first EAS notification:
intercept, from the client computing device that is communicatively coupled to the router computing device, a first Internet Protocol (IP) streaming content request that is directed to the content server by being configured to:
receive the first IP streaming content request via a communications network; and
prevent the first IP streaming content request from being passed on via a communications network to the content server; and
transmit, to the client computing device, a first redirection response message comprising the EAS media file manifest URL;
determine that playback of the EAS media file by the client computing device has ended; and
responsive to determining that the playback of the EAS media file by the client computing device has ended, transmit a completion message to the server computing device, the completion message comprising an identifier of the client computing device and a completion indication representing whether the client computing device viewed the entirety of the EAS media file.

14. The router computing device of claim 13, wherein the processor device is further configured to:
store an IP streaming content URL of the first IP streaming content request;
determine that playback of the EAS media file by the client computing device has ended; and
responsive to determining that the playback of the EAS media file by the client computing device has ended:
retrieve the IP streaming content URL of the first IP streaming content request; and
transmit a second redirection response message comprising the IP streaming content URL to the client computing device.

15. The router computing device of claim 13, wherein the processor device is further configured to:
calculate a duration of the EAS media file; and
responsive to determining that the playback of the EAS media file by the client computing device has ended:
calculate a viewing time of the EAS media file by the client computing device;
compare the duration of the EAS media file with the viewing time,
wherein the completion indication included in the completion message is based on the comparison of the duration of the EAS media file with the viewing time.

16. The router computing device of claim 15, wherein the processor device is further to:
receive, from the server computing device, a second EAS notification; and
responsive to receiving the second EAS notification:
intercept a second IP streaming content request by the client computing device; and
transmit a third redirection response message comprising the EAS media file manifest URL to only the client computing device.

17. The router computing device of claim 13, wherein the processor device is configured to transmit the first redirection response message comprising the EAS media file manifest URL to the client computing device based on the router computing device identifying the client computing device as a streaming media client device.

18. A server computing device, comprising:
a memory; and
a processor device communicatively coupled to the memory and configured to:
transmit, to a router computing device, a first Emergency Alert System (EAS) notification comprising an EAS media file manifest Universal Resource Locator (URL) of an EAS media file, wherein the EAS media file manifest URL indicates a location of an EAS media file manifest;
receive, from the router computing device, a completion message comprising an identifier of a client computing device communicatively coupled to the router computing device and a completion indication representing whether the client computing device viewed the entirety of the EAS media file;
store the identifier of the client computing device, an identifier of the router computing device, an identifier of a subscriber associated with the router computing device, and the completion indication in an EAS viewership database; and
calculate, based on the EAS viewership database, one or more of:
a number of subscribers within a geographic region that received the EAS media file; and
a number of subscribers within the geographic region that did not view the entirety of the EAS media file.

19. The server computing device of claim 18, wherein the processor device is further configured to:
identify, based on the EAS viewership database, at least one subscriber that did not view the entirety of the EAS media file; and
resend a second EAS notification to only at least one router computing device corresponding to the at least one subscriber.

20. The server computing device of claim 18, wherein:
the processor device is further configured to:
identify a geographic region to which the first EAS notification applies; and
determine that the router computing device is within the geographic region; and
the processor device is configured to transmit the first EAS notification to the router computing device responsive to determining that the router computing device is within the geographic region.

\* \* \* \* \*